US008851234B2

(12) United States Patent
Bachorski

(10) Patent No.: US 8,851,234 B2
(45) Date of Patent: Oct. 7, 2014

(54) LADDER CARRYING APPARATUS AND METHOD OF MODIFYING A LADDER

(75) Inventor: William M. Bachorski, Macomb Township, MI (US)

(73) Assignee: Handsaver Handles, LLC, Macomb Township, MI (US)

( * ) Notice: Subject to any disclaimer, the term of this patent is extended or adjusted under 35 U.S.C. 154(b) by 8 days.

(21) Appl. No.: 13/441,440

(22) Filed: Apr. 6, 2012

(65) Prior Publication Data

US 2012/0267195 A1 Oct. 25, 2012

Related U.S. Application Data

(60) Provisional application No. 61/477,979, filed on Apr. 21, 2011.

(51) Int. Cl.
*E06C 7/00* (2006.01)
*B65G 7/12* (2006.01)
*A45F 5/10* (2006.01)

(52) U.S. Cl.
CPC .. *A45F 5/102* (2013.01); *E06C 7/00* (2013.01)
USPC ............... 182/129; 16/422; 294/15; 294/148; 294/166; 224/247

(58) Field of Classification Search
USPC ............. 182/129, 106, 230; 294/15, 16, 148, 294/165, 33, 170; 248/689, 76, 77, 78, 248/441.1, 312.1, 210, 229.16; 16/422–430; 224/247, 101, 270
See application file for complete search history.

(56) References Cited

U.S. PATENT DOCUMENTS

| | | | | |
|---|---|---|---|---|
| 679,183 A * | 7/1901 | McKee | | 294/106 |
| 1,817,233 A * | 8/1931 | Bumgardner | | 294/92 |
| 2,321,018 A * | 6/1943 | Dowd | | 211/64 |
| 2,776,856 A | 1/1957 | Ingram | | |
| 2,873,995 A | 2/1959 | Turner | | |
| 2,997,326 A | 8/1961 | Daum | | |
| 3,718,242 A | 2/1973 | Larson | | |
| 3,948,477 A | 4/1976 | Lample | | |
| 3,990,655 A * | 11/1976 | Covell | | 294/147 |
| 4,085,818 A | 4/1978 | Swager | | |
| 4,112,542 A * | 9/1978 | Snyder | | 16/411 |
| 4,155,582 A * | 5/1979 | Reisner | | 294/58 |
| 4,420,178 A | 12/1983 | Taylor et al. | | |
| 4,491,359 A * | 1/1985 | Metropulos | | 294/147 |
| 4,575,142 A | 3/1986 | Parker | | |

(Continued)

OTHER PUBLICATIONS

Definition of “handle” provided in Action Random House Kernerman Webster’s College Dictionary, © 2010 K Dictionaries Ltd. Copyright 2005, 1997, 1991 by Random House, Inc. All rights reserved.*

*Primary Examiner* — Daniel Cahn
(74) *Attorney, Agent, or Firm* — Quinn Law Group, PLLC.

(57) ABSTRACT

An apparatus for carrying a ladder includes a base, a handle connected to the base, and fingers spaced from one another on the base and generally extending away from the handle. Each of the fingers has a hooked end. A compressible biasing member on the base at least partially extends toward the hooked ends to bias a ladder rail against the hooked ends when the fingers are placed around the ladder rail. The compressible biasing member may be a spring, a flexible tab, a foam pad, or other compressible member. A method of modifying a ladder is also provided.

9 Claims, 10 Drawing Sheets

(56) References Cited

U.S. PATENT DOCUMENTS

| | | | | |
|---|---|---|---|---|
| 4,656,566 | A | 4/1987 | Kelley | |
| 4,678,218 | A * | 7/1987 | Babcock | 294/16 |
| 4,706,598 | A | 11/1987 | Jeffress | |
| 4,726,615 | A * | 2/1988 | Goldberg | 294/16 |
| 4,842,315 | A * | 6/1989 | Nordmeyer | 294/147 |
| 5,058,789 | A * | 10/1991 | Piper | 224/265 |
| 5,161,843 | A | 11/1992 | Baldwin | |
| 5,383,533 | A | 1/1995 | Nikula et al. | |
| 5,511,285 | A * | 4/1996 | Bush et al. | 16/422 |
| 5,549,339 | A | 8/1996 | Frean | |
| 5,735,019 | A | 4/1998 | Kerr et al. | |
| 5,855,346 | A | 1/1999 | Hall | |
| 6,189,752 | B1 | 2/2001 | Perry | |
| 6,193,012 | B1 | 2/2001 | Olivas | |
| 6,193,290 | B1 | 2/2001 | Barbara, Jr. | |
| 6,382,691 | B2 | 5/2002 | Hazelton | |
| 6,402,210 | B1 | 6/2002 | Rhinehart | |
| 6,511,271 | B1 | 1/2003 | Saroka | |
| 6,520,555 | B1 | 2/2003 | Hamm | |
| 6,575,513 | B2 | 6/2003 | Pikel | |
| 6,578,231 | B1 | 6/2003 | Godshaw et al. | |
| 6,672,494 | B1 | 1/2004 | Fernandez | |
| 7,047,604 | B2 | 5/2006 | Axel | |
| 7,104,362 | B2 | 9/2006 | Meeker | |
| 7,140,582 | B1 | 11/2006 | Miller et al. | |
| D567,619 | S | 4/2008 | Rianda | |
| 7,370,727 | B2 | 5/2008 | Meeker | |
| 7,390,042 | B1 | 6/2008 | Miller | |
| 7,588,274 | B2 | 9/2009 | Worthington | |
| 7,591,275 | B2 | 9/2009 | Baker | |
| 7,730,588 | B1 | 6/2010 | Bernier | |
| 7,866,004 | B1 | 1/2011 | Hermann | |
| 8,104,726 | B2 * | 1/2012 | Hoernig | 248/220.22 |
| 8,540,294 | B2 * | 9/2013 | Dowler et al. | 294/15 |
| 2001/0050487 | A1 | 12/2001 | Uridales, Jr. | |
| 2003/0193203 | A1 | 10/2003 | DuBois | |
| 2004/0155474 | A1 | 8/2004 | Bercaw et al. | |
| 2004/0187265 | A1 | 9/2004 | Ho | |
| 2005/0045423 | A1 | 3/2005 | Meeker | |
| 2006/0249331 | A1 | 11/2006 | Meeker | |
| 2007/0063120 | A1 | 3/2007 | Robbins | |
| 2012/0248802 | A1 | 10/2012 | Dowler et al. | |

* cited by examiner

LADDER CARRYING APPARATUS AND METHOD OF MODIFYING A LADDER

CROSS-REFERENCE TO RELATED APPLICATIONS

This application claims the benefit of U.S. Provisional Patent Application No. 61/477,979, filed Apr. 21, 2011, which is hereby incorporated by reference in its entirety.

TECHNICAL FIELD

The present teachings generally include a handle for carrying a ladder and a method of modifying a ladder.

BACKGROUND

Ladders can be bulky and difficult to carry. Both A-frame and extension ladders are usually carried by a user who grips the side rails of the ladder directly with one or both of his or her hands. This can be difficult, as the span of the side rail may be larger than the user's grip and the thin wall of the rail may cause concentrated pressure on the user's hand. The rails may also be slippery if wet. The user must find an appropriate area along the rail at which to hold the ladder, near the center of mass of the ladder, to ensure that the ladder does not tip forward or rearward and contact the ground while being carried.

SUMMARY

An apparatus for carrying a ladder is a handle assembly that includes a base, a handle connected to the base, and fingers spaced from one another on the base and generally extending away from the handle. Each of the fingers has a hooked end. As used herein "hooked ends" include angled ends, such as bent ends, or curved ends. In one embodiment, the fingers are hinged to the base. A compressible biasing member on the base at least partially extends toward the hooked ends to bias a ladder against the hooked ends when the fingers clip around the ladder. The compressible biasing member may be a spring, a flexible tab, a foam pad, or other compressible member.

The handle assembly can clip onto a rail of the ladder to allow the ladder to be carried by the handle. A ladder assembly includes a ladder having two parallel spaced rails, rungs that connect the rails, a base, a handle connected to a first surface of the base, and fingers spaced from one another on the base and generally extending away from the handle and having hooked ends. A compressible biasing member is on a second surface of the base opposite the first surface and at least partially extends toward the hooked ends. The fingers are configured to fit around one of the rails with the compressible biasing member contacting the rail and compressed by the rail to bias the rail against the hooked ends so that the handle is securely positioned on the rail.

A method of modifying a ladder includes pressing a handle assembly against a side of a rail of the ladder so that fingers of the handle assembly can fit around the rail, and thus bias the rail between hooked ends of the fingers and a compressible biasing member of the handle assembly that is in contact with the side of the rail, the handle assembly thereby being fixed to the rail.

The handle assembly thus allows a user to easily transform a ladder without a carrying handle to a ladder with a secure handle assembly that is appropriately placed for ease in carrying the ladder and that does not require removal or any unlatching steps prior to use of the ladder, nor interfere with use of the ladder. The handle assembly can be specifically sized to easily and securely clip to an A-frame ladder or an extension ladder.

The above features and advantages and other features and advantages of the present teachings are readily apparent from the following detailed description of the best modes for carrying out the present teachings when taken in connection with the accompanying drawings.

DETAILED DESCRIPTION

Figure 1:
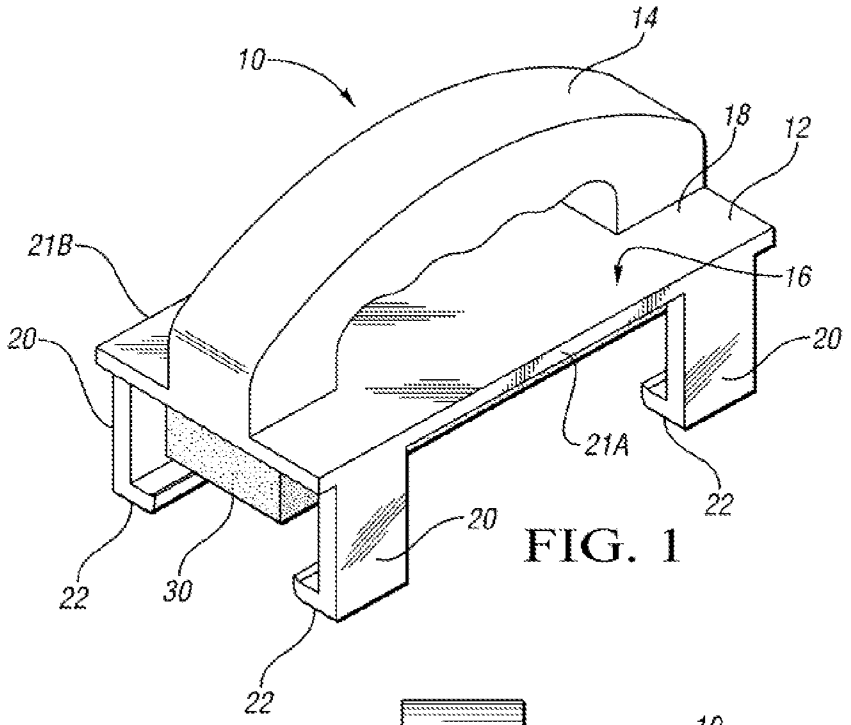
FIG. 1 is a schematic perspective view of a first embodiment of a handle assembly for a ladder in accordance with the present teachings.

Referring to the drawings, wherein like reference numbers refer to like components throughout the several views, FIG. 1 shows an apparatus that is a handle assembly 10 and may be referred to as a clip-on handle for its ease in securely attaching to a component, such as a ladder rail, by simply pressing the handle assembly 10 onto the ladder rail without installing separate fasteners or carrying out other assembly steps. Once clipped to the ladder rail, the handle assembly 10 may be used to carry the ladder.

FIG. 1 shows a first embodiment of a handle assembly 10 that has a base 12 and a handle 14 that extends from a first surface 16 of a first side 18 of the base 12. Fingers 20 extend from opposing sides 21A, 21B of the base 12 in an opposite direction as the handle 14. As used herein, "fingers" are elongated members. Three fingers 20 are visible in FIG. 1. A fourth finger 20 on side 21B is obscured by the base 12 in FIG. 1, but is spaced apart from and parallel with the finger 20 on side 21A in like manner as the other two opposing fingers 20. Within the scope of the present teachings, fewer or more fingers 20 may be used, with at least one finger 20 extending from either edge of the base 12 on either side of the handle 14.

Figure 2:
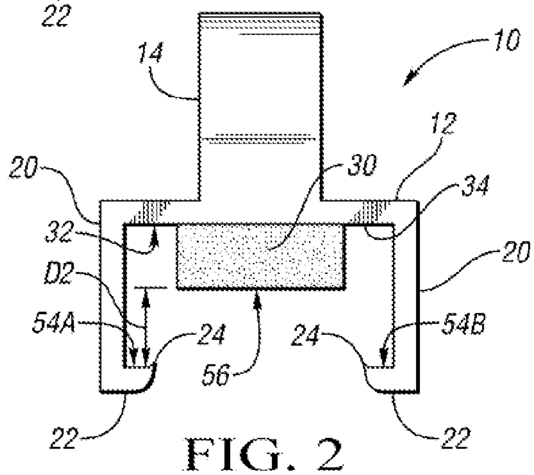
FIG. 2 is a schematic illustration in end view of the handle assembly of FIG. 1.
Figure 3:
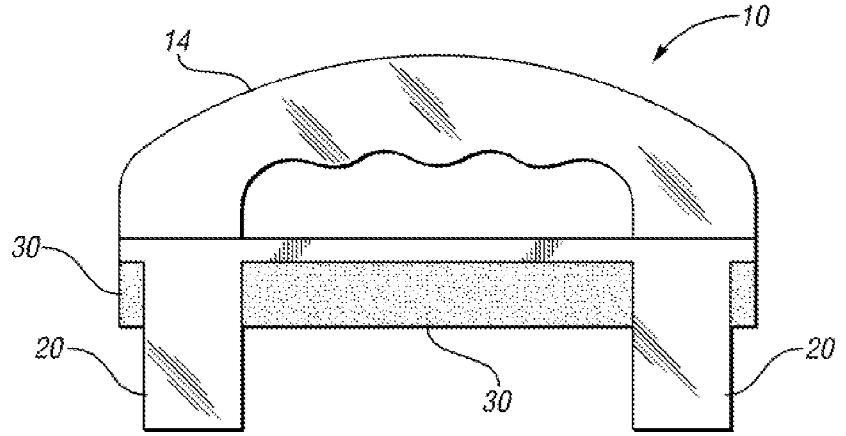
FIG. 3 is a schematic illustration in side view of the handle assembly of FIG. 1.
Figure 19:
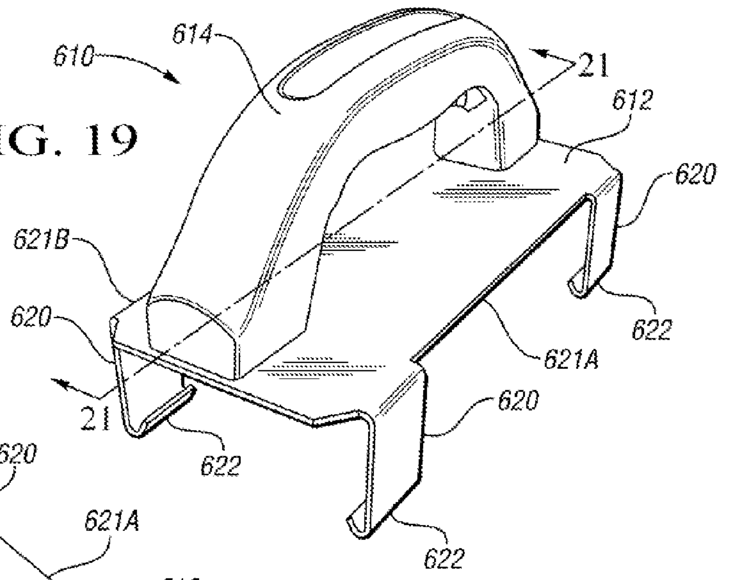
FIG. 19 is a schematic perspective illustration of a seventh embodiment of a handle assembly having an offset handle.
Figure 20:
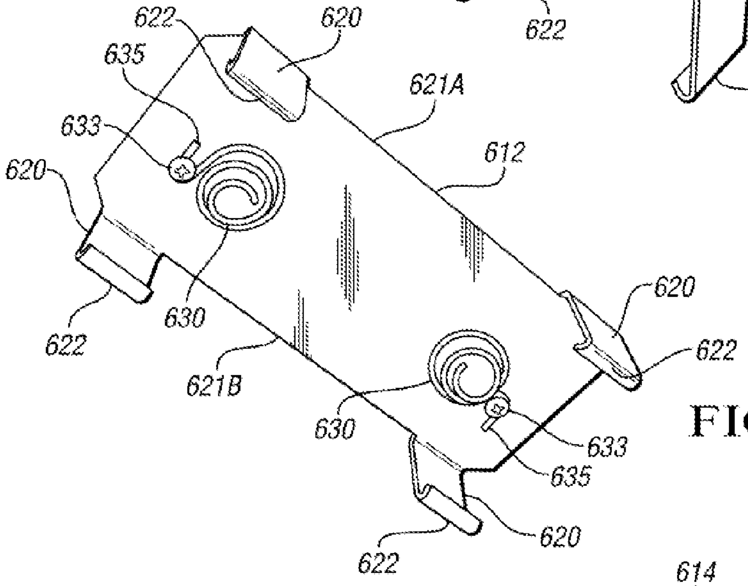
FIG. 20 is another schematic perspective illustration of the handle assembly of FIG. 19 showing compressible biasing members that are springs.

Each finger 20 has a hooked end 22 that extends inward from the finger 20. As shown in FIG. 2, each hooked end 22 has a ridge 24. In other embodiments, the hooked end 22 may not have a ridge. Although shown as a sharply bent flange extending generally perpendicular to the remaining portion of the finger 20, the hooked end may instead have a curved shape as shown on fingers 622 of the embodiment of FIG. 19.

In the embodiment of FIG. 1, the base 12, handle 14 and fingers 20 with hooked ends 22 can be a single, unitary cast, stamped, or injection molded component. In other embodiments, the base 12, handle 14 and fingers 20 can be separate components, the base 12 and fingers 20 can be unitary, or the handle 14 and base 12 can be unitary. Any or all of the base 12, the handle 14, and the fingers 20 can be a high strength plastic, steel, or other suitable material.

FIG. 2 shows a compressible biasing member 30 secured to a second surface 32 of the base 12 on a second side 34 of the base 12 opposite the first side 18. The second surface 32 may be referred to as an inner surface. In this embodiment, the compressible biasing member 30 is a foam rubber pad adhered to the second surface 32 with an appropriate adhesive. Although the compressible biasing member 30 is shown as a flat sheet covering a large portion of the second surface 32, the compressible biasing member may instead be one or two circular pads, or pads of another shape.

Figure 7:
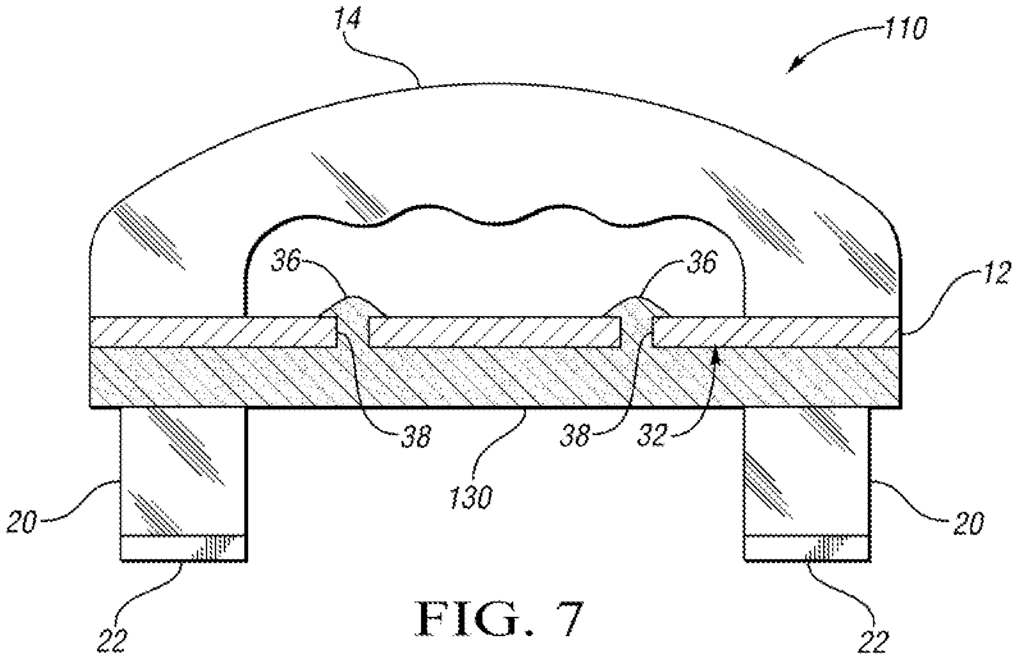
FIG. 7 is a schematic illustration in cross-sectional view of a second embodiment of a handle assembly having a compressible biasing member with integral extension portions that secure the biasing member to the base through openings in the base.
Figure 8:
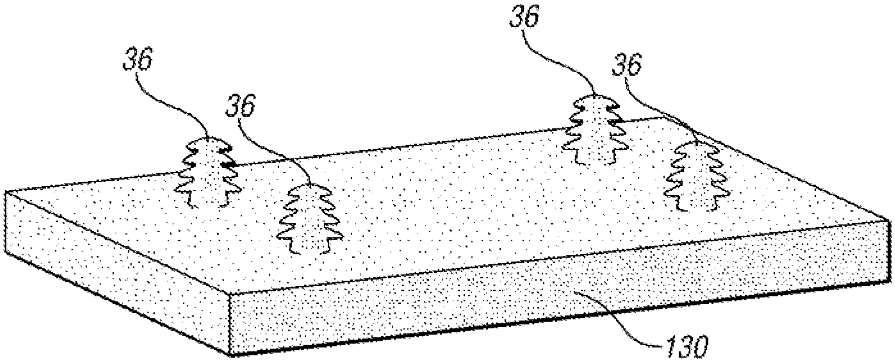
FIG. 8 is a schematic perspective illustration of the compressible biasing member of FIG. 7 showing the integral extension portions.

In another embodiment of a handle assembly 110 shown in FIG. 7, the compressible biasing member 130 is a foam rubber pad with integrally formed foam rubber extensions 36, also referred to as foam rubber mounting members that may be shaped like Christmas tree wedges. In this embodiment, the base 12 has openings 38 smaller in diameter than extensions 36 and sized to allow the extensions 36 to be wedged through the openings 38, with a portion of each of the extensions 36 expanding on the first side 16 of the base 12 to secure the compressible biasing member 130 to the base 12. The compressible biasing member 130 can be secured to the biasing member by only the extensions 36, or adhesive may be used in combination with the extensions 36.

Figure 4:
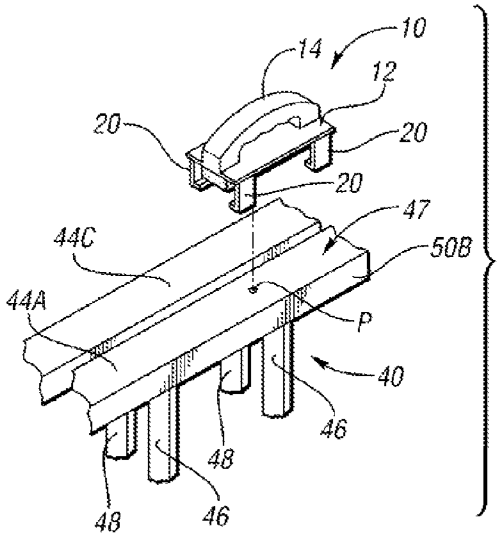
FIG. 4 is a schematic illustration on exploded view of the handle assembly and a ladder shown in fragmentary view in a collapsed, nonuse position.
Figure 5:
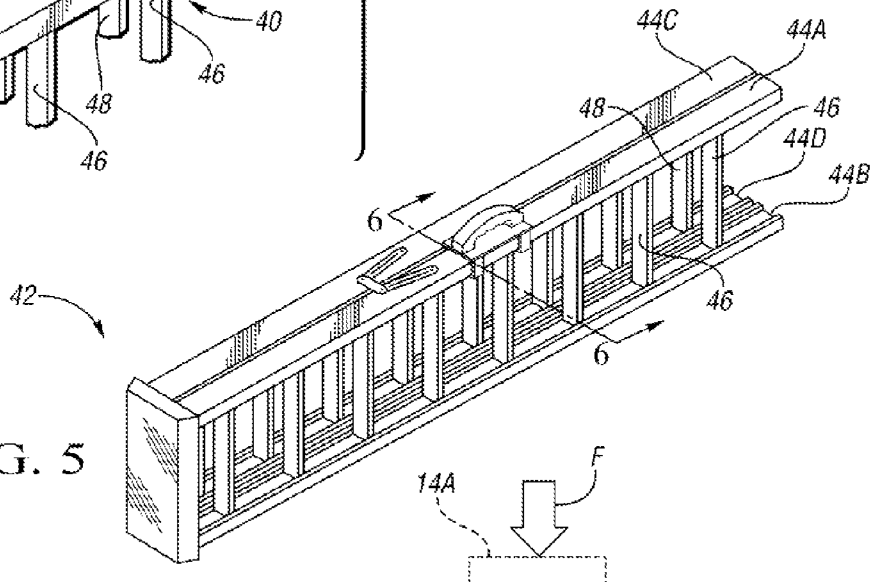
FIG. 5 is a schematic perspective illustration of the ladder of FIG. 4 with the handle assembly clipped on a rail of the ladder and biased against the hooked fingers by a compressible biasing member.

Referring now to FIG. 4, the handle assembly 10 can be clipped onto a ladder 40 to form a ladder assembly 42, shown in FIG. 5. Specifically, the handle assembly 10 clips onto a rail 44A of the ladder 40. The ladder 40 is in a non-use, collapsed position in which the rail 44A of a first pair of rails 44A, 44B is substantially adjacent a rail 44C of a second pair of adjacent rails 44C, 44D. The rails 44A, 44B are separated by and connected by rungs 46. The rails 44C, 44D are separated by and connected by rungs 48. The ladder 40 is an A-frame ladder. The handle assembly 10 can instead be clipped onto a rail of an extension ladder. In either case, the handle assembly 10 is configured with a width W between opposing fingers 20 and a depth D, shown in FIG. 6, to fit securely to the rail 44A, so that it does not move relative to the rail, and allows a person to hold the handle 14 and carry the ladder 40. In other words, the handle assembly 10 can be dimensioned to fit to a rail of an A-frame ladder, or can be dimensioned to fit to a rail of an extension ladder.

Figure 6:
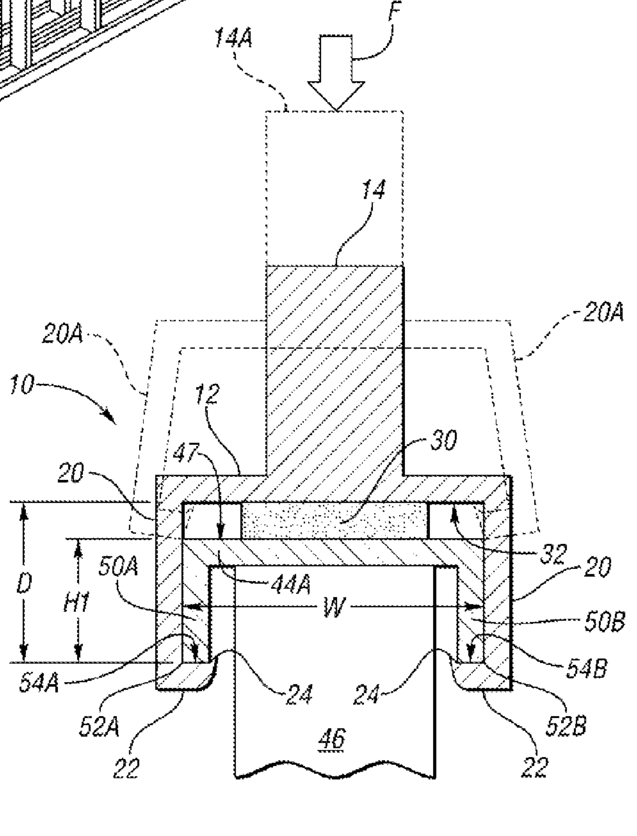
FIG. 6 is a schematic cross-sectional illustration, taken at the lines 6-6 in FIG. 5, of the ladder with the handle assembly clipped onto the rail, and showing the handle assembly in phantom with fingers flexing outward as the handle assembly is pressed toward the rail.

Referring to FIG. 6, the handle assembly 10 is secured to the ladder 40 by first aligning the fingers 20 with the sides 50A, 50B of the rail 44A. The handle assembly 10 is preferably aligned with the rail above an appropriate balance point P (shown in FIG. 4) along the length of the rail 44A to allow the ladder 40 to be easily balanced relatively parallel to the ground when transported by the handle assembly 10. The handle assembly 10 is then pressed downward on the handle 14 with a force F, as shown when the handle assembly 10 is in a first position 14A. This causes the fingers 20 to flex outward to position 20A when the hooked ends 22 contact the rail 44A. Continued pressure applied in the direction of force F causes the fingers 20 to slide over the sides 50A, 50B of the rail 44A. When the tips of the ridges 24 pass the lower outer edges 52A, 52B of the rail 44A, the fingers 20 will snap back to their original, unstressed positions, surrounding the rail 44A, with the compressible biasing member 30 compressed against a surface 47 of the rail 44A.

The rail 44A has a width W that is substantially the same as the distance between the inner surfaces of the opposing fingers 20. The height H1 of the sides 50A, 50B of the rail 44A is less than the distance D, shown in FIG. 2, from the inner surface 32 of the base 12 to the inner surfaces 54A, 54B of the hooked ends 22. However, the height H1 is greater than the distance D2 (shown in FIG. 2) from the inner surfaces 54A, 54B to the bottom surface 56 of the compressible biasing member 30 when the handle assembly 10 is not attached to the ladder 40 (that is, when the compressible biasing member 30 is in an uncompressed state). This causes the rail 44A to compress the compressible biasing member 30 between the rail 44A and the inner surface 32 of the base 12. The compressed compressible biasing member 30 helps to force the rail 44A against the hooked ends 22 of the fingers 20. The ridges 24 help to retain the sides 50A, 50B against the hooked fingers 22.

With the handle assembly 10 clipped to the ladder 40, the ladder 40 may be carried by the handle assembly 10. The handle assembly 10 stays secured in one position on the rail 44A. This allows the ladder 40 to be placed in an upright position, with the sets of rails 44A-44D forming an A-shape. The ladder 40 can then be used, with a person stepping on the rungs 46, while the handle assembly 10 remains on the ladder 40. The handle assembly 10 extends only outward from the rail 44A (on an opposite side of the rail 44A than the rungs), and does not interfere with use of the ladder 40. After use, the ladder 40 can be returned to the nonuse position and carried by the handle 14.

Figure 9:
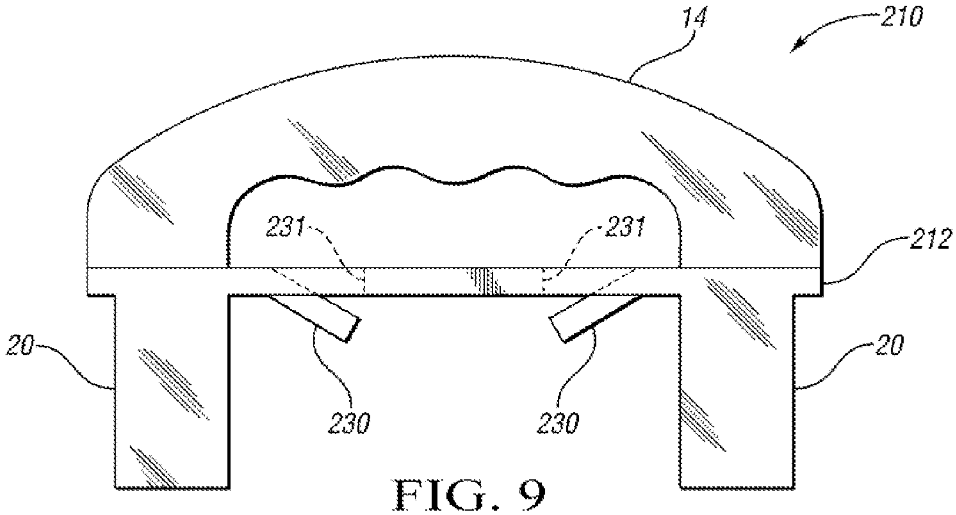
FIG. 9 is a schematic side view illustration of a third embodiment of a handle assembly having compressible biasing members that are integral tabs.
Figure 10:
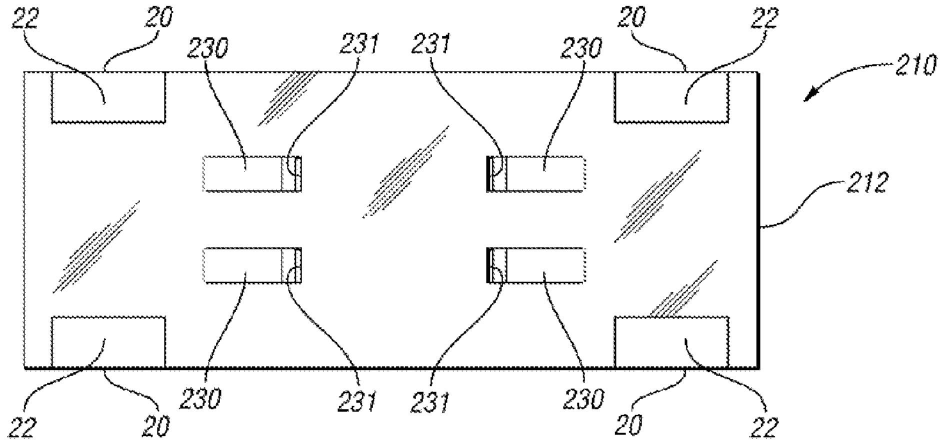
FIG. 10 is a schematic illustration in bottom view of the handle assembly of FIG. 9.
Figure 11:
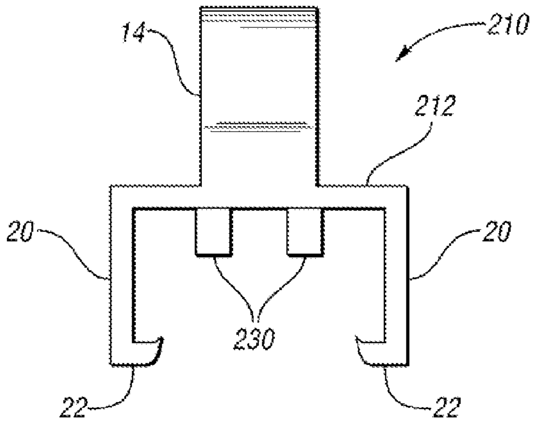
FIG. 11 is a schematic illustration in end view of the handle assembly of FIGS. 9 and 10.

FIGS. 9-11 show another embodiment of a handle assembly 210. In this embodiment, rather than a compressible biasing member 30 that is a foam pad, the handle assembly 210 has a base 212 with openings 231 from which compressible biasing members in the form of tabs 230 extend downward toward the fingers 20. The tabs 230 may be stamped along with the remainder of the base 212 and the fingers 20 as a unitary component. The tabs 230 extend in a longitudinal direction along the base 212, with opposing pairs of the tabs 230 extending toward one another. In other embodiments, fewer or more tabs 230 may be used. The tabs 230 perform the same function as the compressible biasing member 30 of FIG. 1, and are compressed against the surface 47 of the rail 44A, and force the sides 50A, 50B of the rail 44A against the hooked ends 22 when the handle assembly 210 is clipped to the rail 44A.

Figure 12:
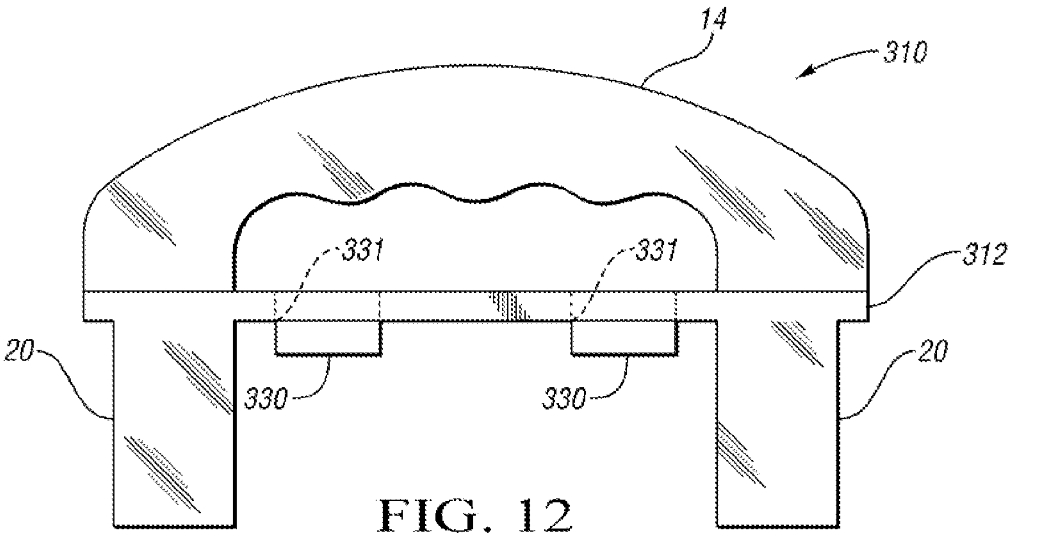
FIG. 12 is a schematic illustration in side view of a fourth embodiment of a handle assembly having compressible biasing members that are integral tabs.
Figure 13:
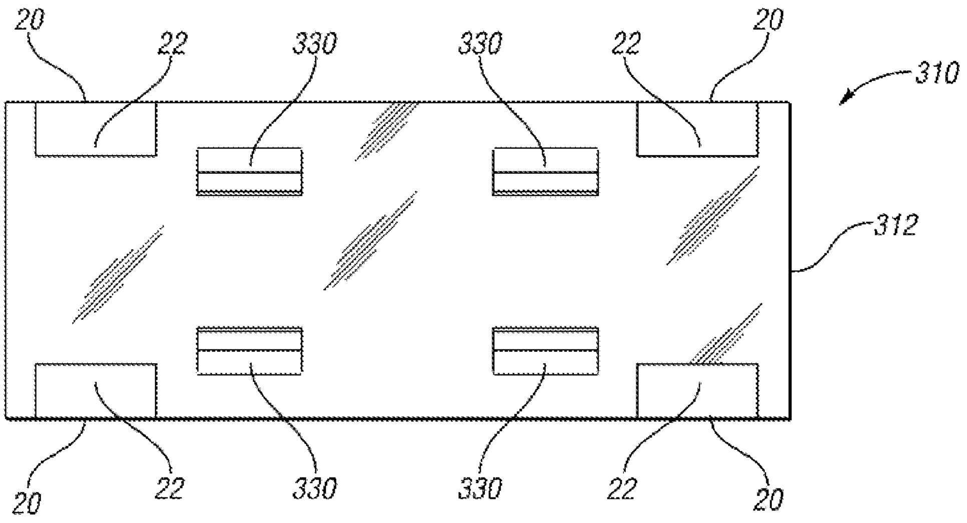
FIG. 13 is a schematic illustration in bottom view of the handle assembly of FIG. 12.
Figure 14:
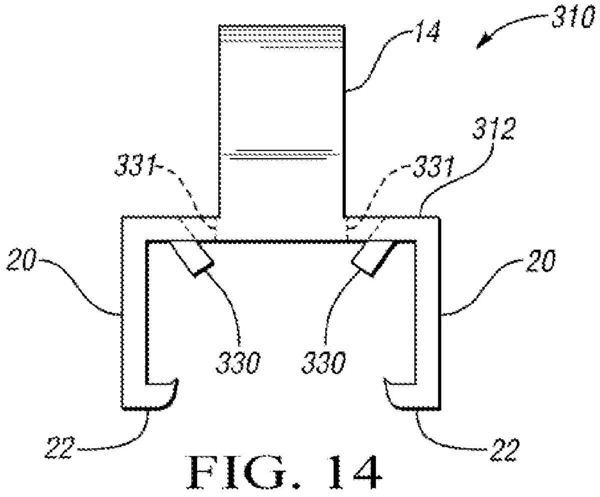
FIG. 14 is a schematic illustration in end view of the handle assembly of FIGS. 12 and 13.

FIGS. 12-14 show another embodiment of a handle assembly 310. In this embodiment, rather than a compressible biasing member 30 that is a foam pad, the handle assembly 310 has a base 312 with openings 331 from which compressible biasing members in the form of tabs 330 extend downward toward the fingers 20 which extend from the base 312. The tabs 330 may be stamped along with the remainder of the base 312 and the fingers 20 as a unitary component. The tabs 330 extend in a transverse direction along the base 312, with opposing pairs of the tabs 330 extending toward one another. That is, the tabs 330 are stamped generally perpendicular to the tabs 230 of the embodiment of FIGS. 9-11. In other embodiments, fewer or more tabs 330 may be used. The tabs 330 perform the same function as the compressible biasing member 30 of FIG. 1, and are compressed against the surface 47 of the rail 44A, and force the sides 50A, 50B of the rail 44A against the hooked ends 22 when the handle assembly 310 is clipped to the rail 44A.

Figure 17:
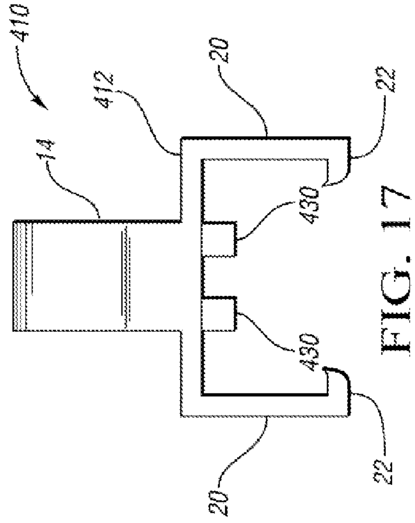
FIG. 17 is a schematic illustration in end view of the handle assembly of FIGS. 15 and 16.
Figure 15:
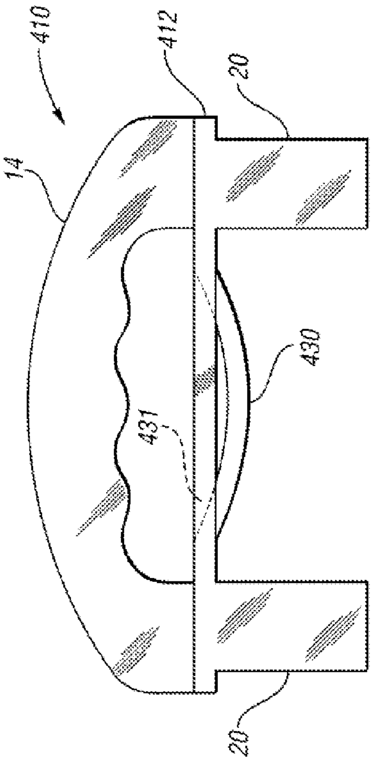
FIG. 15 is a schematic illustration in side view of a fifth embodiment of a handle assembly having compressible biasing members that are integral bowed portions extending longitudinally.
Figure 16:
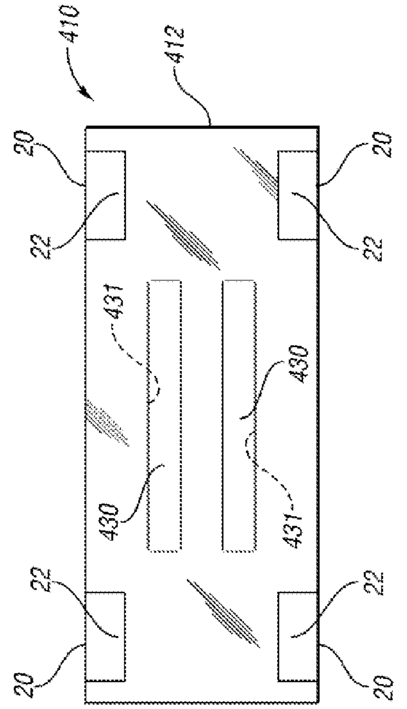
FIG. 16 is a schematic illustration in bottom view of the handle assembly of FIG. 15.

FIGS. 15-17 show another embodiment of a handle assembly 410. In this embodiment, rather than a compressible biasing member 30 that is a foam pad, the handle assembly 410 has a base 412 with openings 431 from which compressible biasing members in the form of flat springs 430 extend downward toward the fingers 20 which extend from the base 412. The flat springs 430 may be stamped along with the remainder of the base 412 and the fingers 20 as a unitary component. The flat springs 430 extend in a longitudinal direction along the base 412. In other embodiments, fewer or more flat springs 430 may be used. The flat springs 430 perform the same function as the compressible biasing member 30 of FIG. 1, and are compressed against the surface 47 of the rail 44A, and force the sides 50A, 50B of the rail 44A against the hooked ends 22 when the handle assembly 410 is clipped to the rail 44A.

Figure 18:
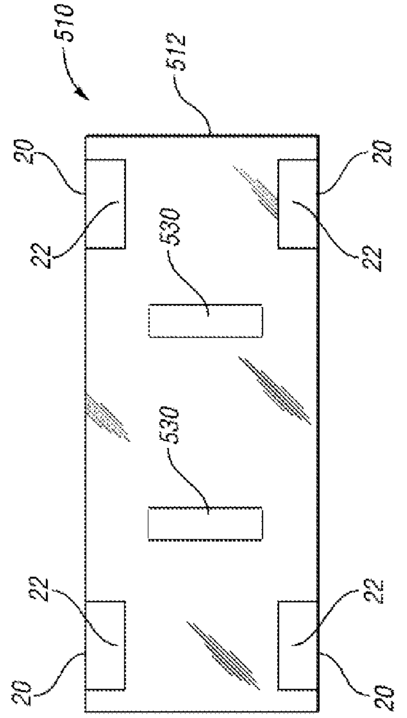
FIG. 18 is a schematic illustration in bottom view of a sixth embodiment of a handle assembly having compressible biasing members that are integral bowed portions extending transversely.

FIG. 18 shows another embodiment of a handle assembly 510 that is similar to handle assembly 410, except that flat springs 530 are stamped in the base 512 in a transverse direction. A handle 14 is not shown in the bottom view of FIG. 18, but extends from the opposing side of the base 512.

Figure 21:
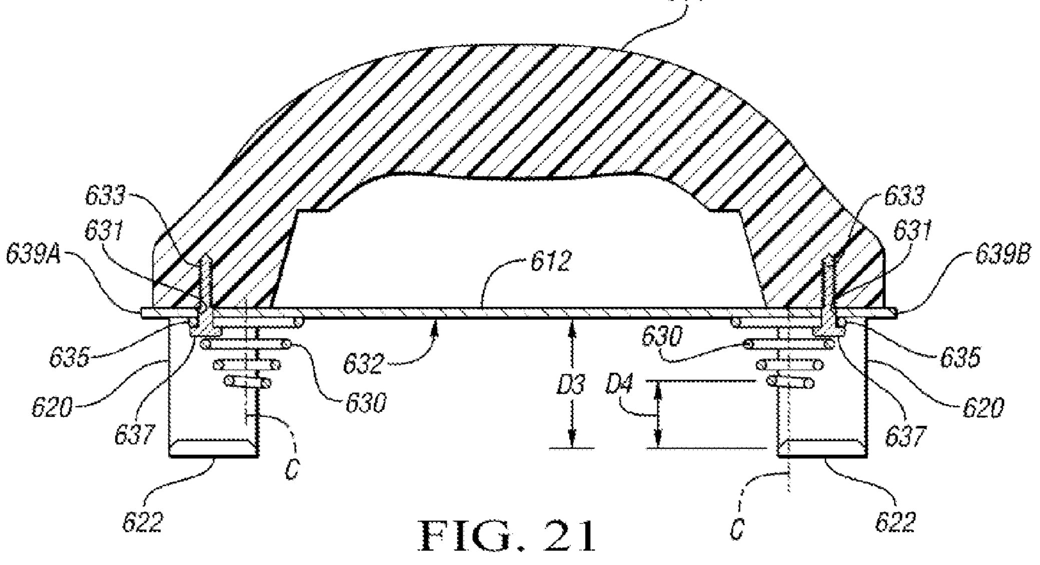
FIG. 21 is a schematic cross-sectional illustration of the handle assembly of FIGS. 19 and 20 taken at the lines 21-21 in FIG. 19.

FIGS. 19-23 show another embodiment of a handle assembly 610. In this embodiment, rather than a compressible biasing member 30 that is a foam pad, the handle assembly 610 has compressible biasing members that are tapered coil springs 630. Each coil spring 630 has a generally spiral shape. The handle assembly 610 has a base 612 with openings 631 that receive fasteners 633 as shown in FIG. 21. The fasteners 633 trap an end 635 of each of the springs 630 between the base 612 and a head 637 of the fastener 633. In other embodiments, fewer or more coil springs 630 may be attached to the base 612 to serve as compressible biasing members.

The fasteners 633 are threaded, and are received in threaded openings of opposing ends of a handle 614 to also retain the handle 614 to the base 612. The openings 631 are laterally offset in the base 612. That is, the openings 631 are closer to one side 621B of the base 612 than the opposing side 621A of the base 612 as is apparent from the position of the handle 614 in FIGS. 19 and 20. This causes the handle 614 to be laterally offset on the base 614. When the handle assembly 610 is clipped to the rail 44A of the ladder 40 of FIG. 5, the handle 614 will be closer to the rail 44C than if the handle 614 were centered over the base 612. The handle 614 will thus be more centered over the center of mass of the ladder 40.

The springs 630 are shaped so that their respective center axes C are positioned longitudinally inward of the fastener 633, as is shown in FIG. 21. The fingers 620, the ends of the handle 614 and the fastener 633 are generally aligned at either end 639A, 639B of the base 612.

Fingers 620 extend from the base 612 in an opposite direction as the handle 614. The fingers 620 have hooked ends 622 with a more continuous curved shape than the flange-like hooked ends 22 of the fingers 20. It should be understood, however, that either type of fingers 20, 620 may be used on any of the handle assembly embodiments disclosed herein.

Figure 22:
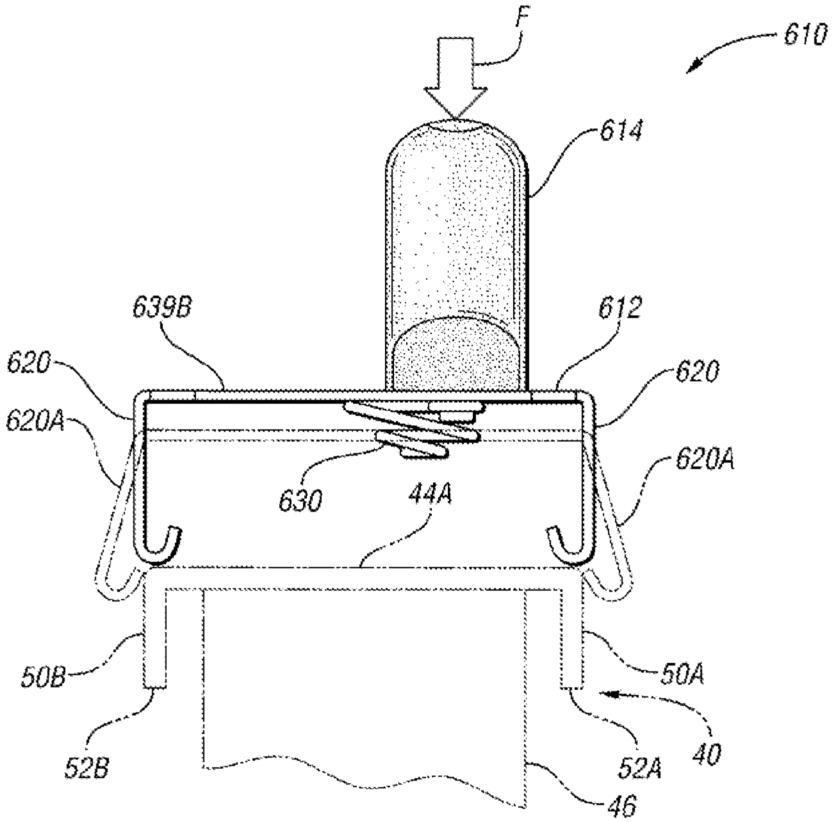
FIG. 22 is a schematic illustration in end view of the handle assembly of FIGS. 19-21 showing the fingers in an alternate position in phantom, flexing outward as the handle assembly is forced onto a ladder rail, also shown in phantom.
Figure 23:
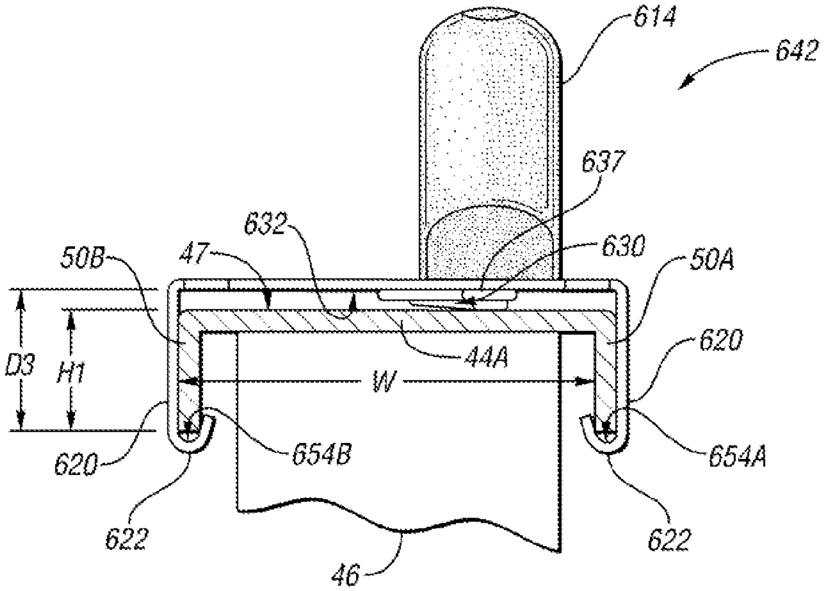
FIG. 23 is a schematic illustration in end view of the handle assembly of FIGS. 19-22 clipped onto the ladder rail.
Figure 24:
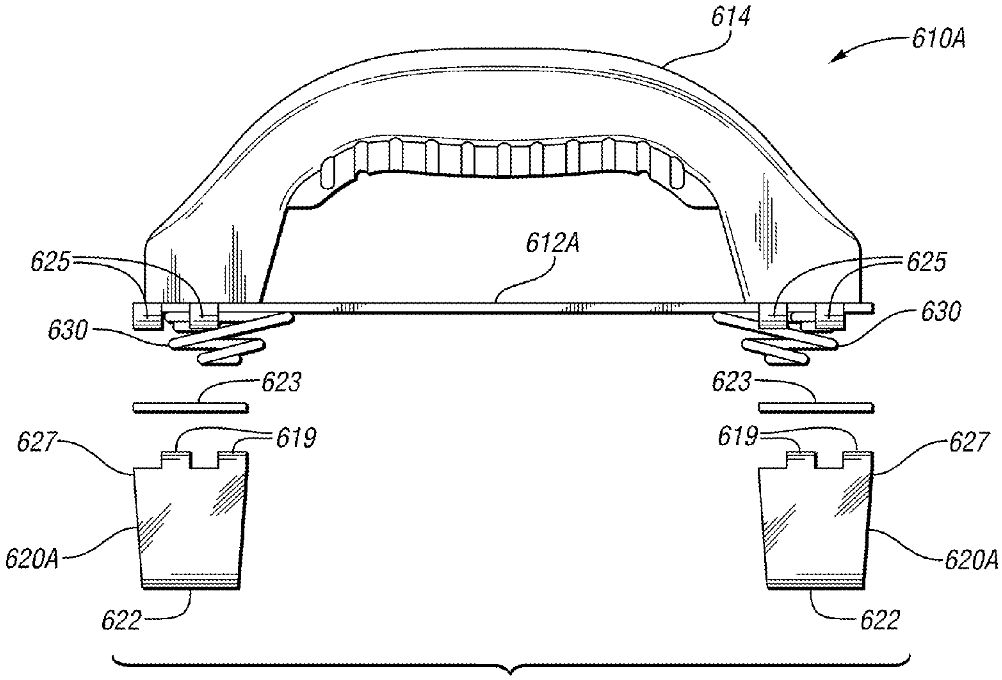
FIG. 24 is a schematic illustration in exploded side view of an eighth embodiment of a handle assembly having an offset handle and fingers hinged to a base.

The handle assembly 610 can be secured to the ladder 40 by first aligning the fingers 620 with the sides 50A, 50B of the rail 44A. FIGS. 22 and 23 show the handle assembly 610 from an end view (that is, from the far right end in FIG. 21 looking to the left). The view of FIGS. 22 and 23 looks along the rail 44A in an opposite direction than in FIG. 6. The ladder 40 is shown in cross section taken at a portion of the rail 44A remote from the handle assembly 610. The handle assembly 610 is preferably placed at an appropriate balance point along the length of the rail that will allow the ladder 40 to be easily balanced relatively parallel to the ground when transported by the handle assembly 610. The handle assembly 610 is then pressed downward on the handle 614 with a force F, as shown in FIG. 22. This causes the fingers 620 to flex outward to position 620A when the hooked ends 622 contact the rail 44A. Continued pressure applied in the direction of force F causes the fingers 620 to slide over the sides 50A, 50B of the rail 44A. When the tips of the ends 622 pass the lower outer edges 52A, 52B of the rail 44A, the fingers 620 will snap back to their original, unstressed positions, surrounding the rail 44A, with the springs 630 compressed against a surface 47 of the rail 44A.

The width W of the rail 44A is substantially the same as the distance between the inner surfaces of the opposing fingers 620. The height H1 of the sides 50A, 50B of the rail 44A is less than the distance D3, shown in FIG. 21, from the inner surface 632 of the base 612 to the lowest point of the inner surfaces 654A, 654B of the hooked ends 622. However, the height H1 is greater than the distance D4 from the inner surfaces 654A, 654B to the bottom of the springs 630 when the handle assembly 610 is not attached to the ladder 40 (that is, when the springs 630 are in an uncompressed state shown in FIG. 21). This causes the rail 44A to compress the springs 630 between the rail 44A and the inner surface 632 of the base 612. The compressed springs 630 help to force the rail 44A against the hooked ends 622 of the fingers 620.

The handle assembly 610 clipped to the ladder rail 44A forms a ladder assembly 642 that enables the ladder 40 to be carried by the handle assembly 610. The handle assembly 610 stays secured in one position on the rail 44A. This allows the ladder 40 to be placed in an upright position, with the sets of rails 44A-44D forming an A-shape. The ladder 40 can then be used, with a person stepping on the rungs 46, while the handle assembly 610 remains on the ladder 40. The handle assembly 610 extends only outward from the rail 44A, and does not interfere with use of the ladder 40. After use, the ladder 40 can be returned to the nonuse position and carried by the handle 614. The handle assembly 610, like each of the handle assemblies disclosed herein, can be dimensioned to clip onto the rail of an A-frame type ladder or to an extension ladder.

Figure 25:
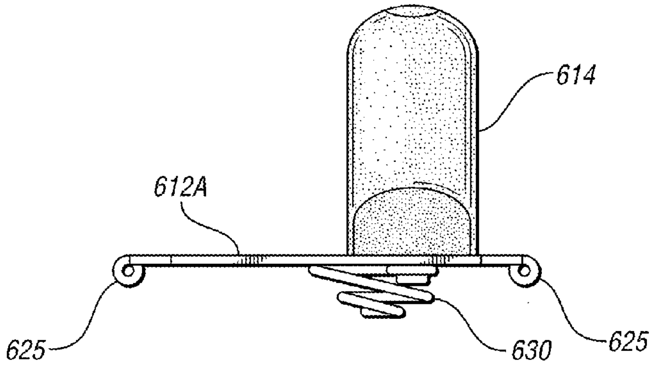
FIG. 25 is a schematic illustration in end view of the base and offset handle of FIG. 24.
Figure 26:
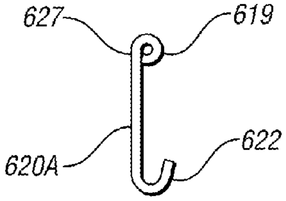
FIG. 26 is a schematic illustration in side view of one of the fingers of FIG. 24 showing a hinged end and a hooked end.

FIGS. 24-28 show another embodiment of a handle assembly 610A that is like handle assembly 610 except that fingers 620A are hinged to a base 612A. The handle assembly 610A has four fingers 620A positioned on the base 612A in identical positions as fingers 620 are positioned on base 612, shown in FIG. 20. Specifically, each of the four fingers 620A (two shown in the side view of FIG. 24) has two knuckles 619 each forming at least a partial cylinder, shown in FIG. 26, sized to receive a hinge pin 623. The knuckles 619 are at a hinged end 627 opposite the hooked end 622. The base 612A has knuckles 625 spaced complementary to knuckles 619 and also each forming at least a partial cylinder, as shown in FIG. 25, to receive a hinge pin 623. When the fingers 620A are placed adjacent the base 612A with the knuckles 619, 623 alternating, the hinge pins 623 are placed through the openings in the knuckles 619, 623 to hingedly connect the fingers 620A to the base 612A.

Figure 27:
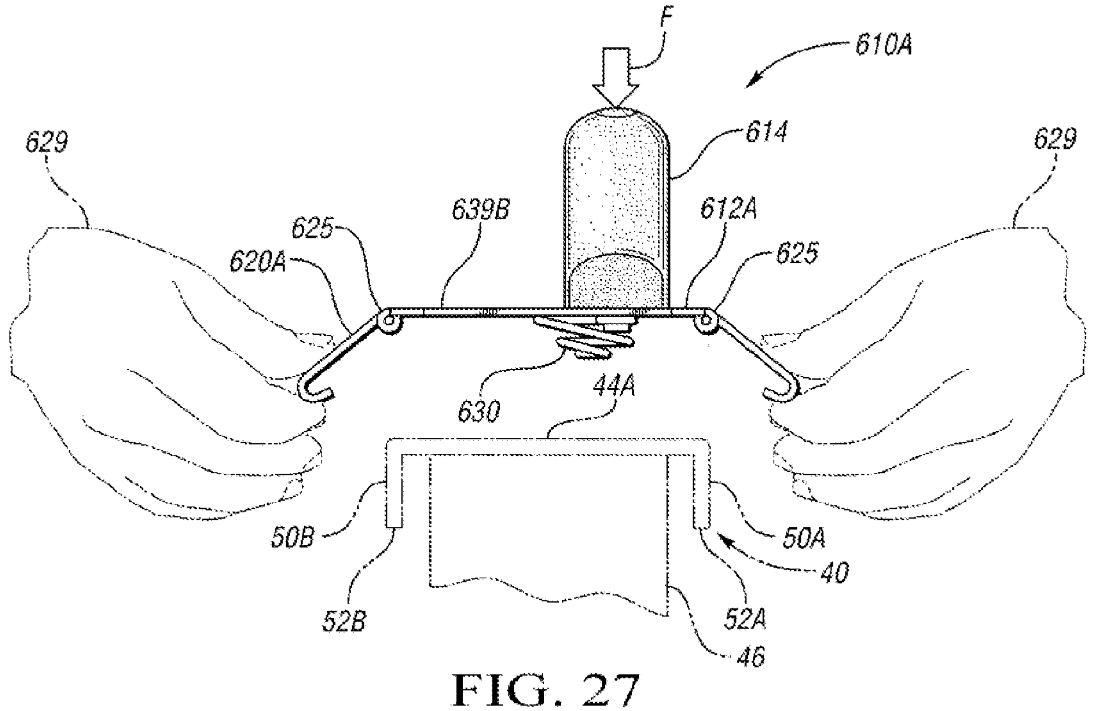
FIG. 27 is a schematic illustration in end view of the handle assembly of FIGS. 24-26 aligned with a ladder rail shown in phantom and showing the fingers manually held in an alternate position by hands shown in phantom.

FIG. 27 shows the handle assembly 610A aligned with the ladder 40 at an appropriate balance point, as discussed with respect to the ladder assembly 610. The handle assembly 610A is pressed downward toward the ladder 40 with a force F while the hooked ends 622 of the hinged fingers 620A are manually positioned over and around the sides 50A, 50B of the rail 44A. FIG. 27 shows hands 629 in phantom positioning the fingers 620A to be clipped to rail 44A. Because the fingers 620A are hinged and are manually manipulated over the sides 50A, 50B, they do not need to flex to clip onto the sides 50A, 50B, and hence may be of any desired thickness.

Figure 28:
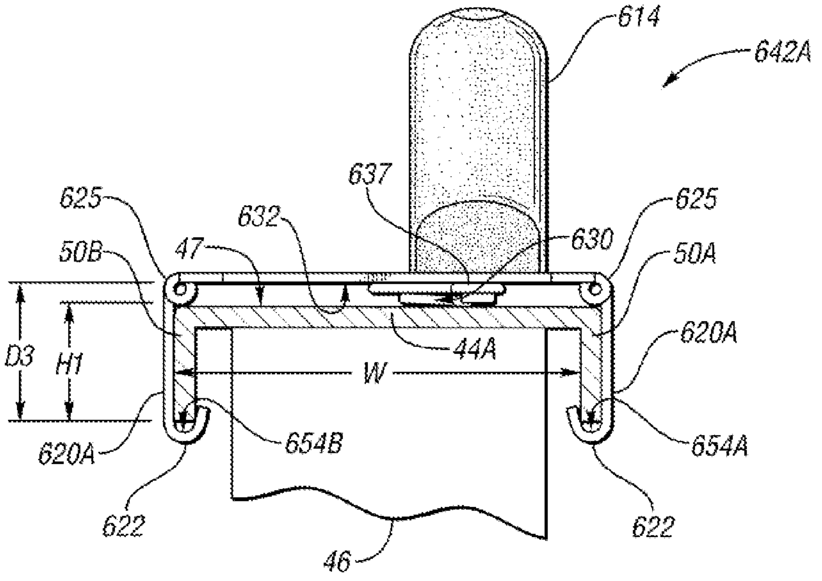
FIG. 28 is a schematic illustration in end view of the handle assembly of FIGS. 24-27 clipped onto the ladder rail.

Once the hooked ends 622 are placed around the sides 50A, 50B as shown in FIG. 28, the force F can be removed. The biasing springs 630 will then bias the sides 50A, 50B of the ladder against the hooked ends 622 to retain the handle assembly 610A to the ladder 40.

In each of the embodiments disclosed herein, the handle assembly 10, 110, 210, 310, 410, 510, 610, 610A clips onto the ladder rail 44A by exerting force toward the rail 44A in one direction. No separate fasteners are used to retain the handle assembly 10, 110, 210, 310, 410, 510, 610, 610A to the ladder rail 44A. Rather, the rail 44A is simply pressed against the hooked ends of the fingers 20, 620, 620A by the various compressible biasing members disclosed herein to trap the rail 44A and retain the rail 44A to the handle assembly 10, 110, 210, 310, 410, 510, 610, 610A.

Accordingly, a method of modifying a ladder 40 is described with respect to the handle assembly 610 but applies equally to any of the handle assemblies described herein. The method includes aligning the fingers 620 of the handle assembly 610 with the sides 50A, 50B of the rail 44A. The method may also include determining a balance point P along the length of the rail 44A (see FIG. 4) and positioning the aligned handle assembly 610 over the balance point. Once aligned and positioned, the method includes pressing the handle assembly 610 against the rail 44A until hooked ends 622 of the fingers 620 fit around the rail 44A. With the handle assembly 610, the fingers 620 are forced outward, slide past the sides 50A, 50B, and clip around the sides 50A, 50B. No other fastening steps or securing steps are required. The depression force F alone clips and secures the handle assembly 610 to the rail 44A. For the handle assembly 610A, the hooked ends 622 of the fingers 620A are manually placed around the rail 44A while the depression force F is applied. When the depression force F is removed, the biasing force of the springs 630, or other compression member used in other embodiments, retains the hooked ends 622 to the rail 44A.

The method then includes carrying the ladder 40 by the handle 614. Further, because the handle assembly 610 extends only outward from the rail 44A and does not interfere with any of the rungs 46, 48, the ladder 40 can be used with the handle assembly 610 clipped to the rail 44A. That is, a person can set the ladder 40 upright and step on the rungs 46 with the handle assembly 610 still clipped to the rail 44A at the balance point P. Because the handle assembly 610 is clipped to only one rail 44A, and does not lock the adjacent rail 44C to the rail 44A, the handle assembly 610 need not be removed to use the ladder 40. When finished using the ladder 40, the user can then collapse the ladder 40 and carry the ladder 40 by the handle 614. Because the handle assembly 610 was previously positioned at an appropriate balance point P, the user need not remove or reposition the handle assembly 610. Each embodiment of a handle assembly 10, 110, 210, 310, 410, 510, 610, and 610A disclosed herein affords such ease in securely clipping to the ladder 40, and can be conveniently left in place while using the ladder.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. An apparatus for carrying a ladder having a ladder rail, the apparatus comprising:

a base;

a handle connected to the base;

fingers spaced from one another on the base and generally extending away from the handle and having hooked ends;

a compressible biasing member on the base at least partially extending toward the hooked ends to bias the ladder rail against the hooked ends when the fingers are placed around the ladder rail;

wherein the compressible biasing member is a first spring connected to a side of the base that is surrounded by the fingers; wherein the handle has a first end and a second end with a gripping portion extending between the first end and the second end;

a second spring spaced from the first spring and connected to the base on the side of the base;

a first fastener fastening the first spring to the base;

a second fastener fastening the second spring to the base; and wherein the first fastener extends through the base and into the first end of the handle and the second fastener extends through the base and into the second end of the handle to also fasten the handle to the base;

wherein the fingers are configured to clip onto the ladder rail so that the ladder rail extends between the springs and the hooked ends, and configured to have the springs bias the ladder rail against the hooked ends to secure the apparatus to the ladder rail.

2. The apparatus of claim 1, wherein the first and second springs have a tapered spiral shape.

3. The apparatus of claim 1, wherein the handle extends from a first side of the base; wherein the side of the base to which the first spring and the second spring are connected is a second side of the base; wherein the fingers extend from the second side of the base; wherein a first of the fingers extends from a first edge of the base and a second of the fingers extends from an opposing second edge of the base; and wherein the handle is fastened to the base closer to the first edge than to the second edge so that the handle is laterally offset on the first side of the base.

4. The apparatus of claim 1, wherein the fingers include at least one pair of opposing fingers that are generally parallel and substantially aligned with one another, with the hooked ends of the opposing fingers extending toward one another.

5. The apparatus of claim 1, wherein at least some of the fingers are hinged to the base.

6. The apparatus of claim 1 the ladder; wherein the fingers are configured to clip onto the ladder rail so that the ladder rail extends between the springs and the hooked ends, and so that the springs bias the ladder rail against the hooked ends to secure the apparatus to the ladder rail.

7. The apparatus of claim 6 in combination with the ladder, wherein the ladder rail is a first rail; wherein the ladder has an additional pair of spaced rails connected by additional rungs; wherein the ladder is collapsible to a position in which one of the rails of the additional pair of spaced rails is substantially parallel and adjacent to the first rail; and wherein a first of the fingers extends from a first edge of the base and a second of the fingers extends from an opposing second edge of the base; and wherein the handle is mounted to the base closer to the first edge than to the second edge so that the handle is offset from a center of the base toward said one of the rails of the additional pair of spaced rails.

8. The apparatus of claim 6 in combination with the ladder, wherein at least some of the fingers are hinged to the base.

9. The apparatus of claim 6 in combination with the ladder, wherein each of the fingers has a respective one of said hooked ends; wherein at least some of the fingers each have a hinged end with a knuckle opposite said respective one of said hooked ends;

wherein the base has additional knuckles; and hinge pins connecting the knuckles of said at least some of the fingers to the additional knuckles of the base.

* * * * *

UNITED STATES PATENT AND TRADEMARK OFFICE
CERTIFICATE OF CORRECTION

PATENT NO. : 8,851,234 B2
APPLICATION NO. : 13/441440
DATED : October 7, 2014
INVENTOR(S) : William M. Bachorski It is certified that error appears in the above-identified patent and that said Letters Patent is hereby corrected as shown below:

In the Claims

Column 10, lines 1-5:

Cancel the text beginning with "6. The apparatus of claim 1" and ending with "to secure the apparatus to the ladder rail" and insert the text: --6. The apparatus of claim 1, in combination with the ladder.--

Signed and Sealed this
Sixth Day of January, 2015

Michelle K. Lee

Michelle K. Lee
*Deputy Director of the United States Patent and Trademark Office*